US00RE39864E

(19) United States
(12) Reissued Patent
Athale et al.

(10) Patent Number: US RE39,864 E
(45) Date of Reissued Patent: Oct. 2, 2007

(54) CONTROLLED DIFFRACTION EFFICIENCY FAR FIELD VIEWING DEVICES

(75) Inventors: Ravindra A. Athale, Burke, VA (US); Joseph van der Gracht, Columbia, MD (US)

(73) Assignee: HoloSpex, Inc., Columbia, MD (US)

(21) Appl. No.: 10/857,803

(22) Filed: May 28, 2004

Related U.S. Patent Documents

Reissue of:
(64) Patent No.: 6,452,699
Issued: Sep. 17, 2002
Appl. No.: 09/671,092
Filed: Sep. 27, 2000

U.S. Applications:
(60) Provisional application No. 60/156,406, filed on Sep. 28, 1999.

(51) Int. Cl.
*G03H 1/00* (2006.01)

(52) U.S. Cl. ..... 359/13; 359/9; 351/51
(58) Field of Classification Search ..... 359/1, 359/9, 13, 22, 29, 32, 33; 351/51, 52, 158
See application file for complete search history.

(56) References Cited

U.S. PATENT DOCUMENTS 5,196,951 A * 3/1993 Wreede ..... 359/15
5,210,625 A * 5/1993 Moss et al. ..... 359/1
5,278,008 A * 1/1994 Moss ..... 359/9
5,519,516 A * 5/1996 Wreede ..... 359/3
5,546,198 A * 8/1996 van der Gracht et al. ..... 359/1
6,961,159 B2 * 11/2005 Yamauchi et al. ..... 359/3

OTHER PUBLICATIONS

Isreal Government Coins and Medals Corporation "*And There Was Ligh" Isreal State Medal Designed by Yaacov Agam* (undated).*

Saxby, "*Practical Holography*" Prentice Hall, 1998, pp. 209,211.*

* cited by examiner

*Primary Examiner*—Leonidas Boutsikaris
(74) *Attorney, Agent, or Firm*—Roberts, Mardula & Wertheim, LLC

(57) ABSTRACT

This invention pertains to the design of optimized far field viewing devices that simultaneously produce bright far field holographic light patterns and achieve good see-through performance to present a well focused scene. A far field transmission hologram recorded on a transparent substrate has regions having high diffraction efficiency juxtaposed with regions having low diffraction efficiency. The high diffraction efficiency regions contribute to production of bright far field holographic light patterns, whereas the low diffraction efficiency regions contribute to see-through performance.

41 Claims, 10 Drawing Sheets

CONTROLLED DIFFRACTION EFFICIENCY FAR FIELD VIEWING DEVICES

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority under 35 U.S.C. §119(e) from U.S. provisional application No. 60/156,406, filed Sep. 28, 1999. The Ser. No. 60/156,406 application is incorporated herein by reference in its entirety for all purposes.

BACKGROUND OF THE INVENTION

1. Field of the Invention

This invention relates to controlling the brightness of light patterns created by a hologram. More specifically, this invention balances the brightness of a far field holographic light pattern and the clarity of a scene when viewed through a far field viewing device.

2. Background Information

Holograms of many different types have become commonplace in modern society. They are used as ornaments and as novelty items, as well as security devices on credit cards. A hologram is a pattern recorded on a substrate that provides a predetermined light diffraction effect.

There are many different types of holograms that are differentiated from one another by their optical properties and behavior. Most of the commonly seen holograms depend upon reflection of light from the hologram to the observer's eye. Less commonly seen are transmission type holograms wherein light passes through the hologram.

When an observer looks through a far field hologram at a scene that contains compact bright points of light, the observer sees holographic diffracted light patterns associated with each bright point location. We define this unique form of display holography as a far field viewing application. Far field viewing devices are made up of physical apertures (or frames) and far field holograms combined in a way designed for viewing a scene and superimposing holographic light patterns around each compact bright point of light in the scene.

Referring to FIG. 1, a far field viewing device containing of a far field hologram 10 mounted in a frame 12 is illustrated. The far field viewing device is placed in front of an observer's eye 14. The observer's eye 14 looks through far field hologram 10 mounted in frame 12 at a scene containing at least one bright compact source of light 16. Each point in the scene is viewed through a utilized hologram area 18. Schematic depictions of a tree and a star represent scene elements 20 that the observer wants to see in sharp focus.

Examples of far field viewing devices include the eyeglass device containing far field holograms as described in U.S. Pat. No. 5,546,198, as well as far field holograms mounted in windows. Ordinarily, a human observer looks through a far field device. Additionally, far field devices can also be incorporated into film-based or electronic image capture devices, such as still or motion cameras.

An example of an algorithm for calculating computer generated holograms is described by Gallagher and Liu. See N. C. Gallagher and B. Liu, "Method for Computing Kinoforms That Reduces Image Reconstruction Error" Applied Optics, v. 12, pp.2328–2335 (1973). The output of the algorithm is a set of numerical values. Each value corresponds to the desired complex transmittance at a different spatial location on the physical hologram. The resultant data set is used to drive any of a variety of fabrication methods which impose the desired transmittance values onto a physical substrate. There are a number of methods for producing a physical computer generated hologram from a set of date. These are summarized in the textbook MICROOPTICS [editor Hans P. Herzig, published by Taylor and Francis, London 1997] in chapters 4 and 5. An original hologram can be used as a master and copied or replicated using a variety of techniques as discussed in chapter of 7 of Herzig's MICROOPTICS.

Referring to FIG. 2, an idealized view of the overall scene as seen through an ideal far field viewing device is illustrated. The ideal view contains a well-focused representation of scene elements 220 in addition to a desired diffracted light pattern 222 produced by light diffracted by the far field hologram adjacent a bright compact source of light 216. In the example, the hologram has been tailored to diffract the light pattern in the form of letters spelling the word "NOEL". FIG. 2 shows only one bright compact point of light to keep the illustration simple. In the case where many such sources of light are present, the desired diffraction pattern will surround each bright compact source of light.

A salient aspect of far field viewing applications that is different from most display hologram applications is that the observer is encouraged not to focus all of the attention on the holographic diffracted light pattern. Instead, the observer focuses on an overall scene in a unique combination with the holographic diffracted light patterns at each bright point source of light present in the scene. Accordingly, it is important for the viewing device to present a clear image of the scene while also presenting bright holographic light patterns.

It is also desirable for a far field viewing device to have a loose tolerance for the distance between the observer's eye and the hologram so that the viewer is not forced to maintain a particular position relative to the far field viewing device.

Additionally, it is desirable for the hologram in a far field viewing application to be capable of producing relatively large diffracted light patterns containing fine spatial detail.

The problem of balancing the clarity of the scene and the brightness of the holographic light patterns is not common in display holography. In most applications of display holography, the hologram is designed to diffract as much of the light as possible to create the brightest possible holographic reconstruction. Such a hologram is said to have high diffraction efficiency. The push in the industry is directed to design methods and fabrication processes that maximize the diffraction efficiency of display holograms since most applications of display holography call for maximum brightness in the holographic reconstruction.

Referring to FIG. 3, a view through a high diffraction efficiency far field hologram is illustrated. The scene elements appear as blurred images 324 when viewed through a far field transmission hologram having a high diffraction efficiency. FIG. 3 also shows that such a far field hologram also produces an undesired diffracted light pattern 326, symmetrically disposed about a bright compact light source 316 in the form of a mirror image of desired diffracted light pattern 322.

In contrast, our goal for far field viewing applications is to attain a diffraction efficiency that is often considerably less than the diffraction efficiency produced by standard methods for designing and fabricating holograms. When a highly efficient far field hologram is used in a far field viewing application, the diffracted light patterns are bright but the scene appears blurred. This effect on the view of the scene is much like looking through a light diffusing piece of shower glass, and it is undesirable since viewing, not obscuration, is desired. On the other hand, when the hologram has low diffraction efficiency the scene observed through the hologram appears well focused, but the holographic light patterns surrounding the point sources of light in the scene are not sufficiently bright.

Whereas the prior art provides no way to simultaneously maximize the scene clarity and the brightness of the holographic light patterns, we recognize that the diffraction efficiency of the hologram should be chosen to strike an optimum balance between the un-diffracted energy and the energy in the desired diffracted light pattern. The optimum diffraction efficiency can depend on the nature of the desired holographic pattern as well as the expected scene characteristics. Thus, flexible and simple control in achieving the desired diffraction efficiency of the hologram is needed.

One broad approach to the problem of reducing diffraction efficiency would be to start with an established method that produces high diffraction efficiency and to modify the approach to obtain reduced diffraction efficiency. The need for intentionally reducing diffraction efficiency of a far field hologram in a controlled manner has not been recognized in the prior art. In contract, we have made it a goal to increase the amount of un-diffracted light by reducing the amount of energy in the desired diffracted light pattern. Preferably, the modified process should not substantially increase the energy into undesired diffracted distributions that would distract from the desired diffracted pattern.

An unsatisfactory solution would be to modify standard hologram fabrication processes by adjusting process parameters to achieve the desired diffraction efficiency. In an amplitude hologram, it is possible to reduce the diffraction efficiency by reducing the transmittance contrast of the hologram. The transmittance contrast is a measure of the ratio of the highest transmittance to the lowest transmittance. Lowering the transmission contrast would in fact make the diffracted pattern weaker and improve the see-through performance of the hologram as desired. A significant drawback is that nonstandard processes would have to be developed to accomplish this. The use of nonstandard processes leads to increased costs and increased process variations.

In a binary phase hologram, it is possible to reduce the diffraction efficiency by changing the phase modulation depth. The phase modulation depth is a measure of the maximum optical path length difference between the two transmittance states in the hologram. As in the amplitude case, implementation of this solution would require processes that need tight control over transmittance contrast or phase modulation depth. Such processes are difficult to establish and maintain. These problems lead to increased costs and questionable repeatability, since non-standard fabrication procedures would be needed.

Additionally, a significant limitation of amplitude holograms and binary phase holograms is their restriction to Hermitian symmetric holographic light reconstruction patterns. Hermitian symmetry means that the desired reconstruction pattern is always accompanied by a copy of the pattern that is rotated by 180 degrees about the un-diffracted component. This undesired symmetric diffraction pattern in the form of a mirror image of the desired pattern is distracting in many cases. Furthermore, the undesired diffraction pattern takes up a large space that could otherwise be used to create larger and more complicated desired diffracted light patterns.

As discussed in our previous patent, U.S. Pat. No. 5,546,198, multilevel phase computer generated holograms (CGH's) can diffract light into asymmetric light patterns thus eliminating the distracting reversed diffracted copy and enabling a larger area for more complicated light patterns. In practice, such holograms are highly efficient and have poor see-through performance resulting in a severely blurred scene when used in a far field viewing device. The idea of decreasing diffraction efficiency by modifing process parameters is not an available option for multilevel phase CGH's. Unlike the case of binary CGH's, intentionally reducing the phase modulation to reduce diffraction efficiency of a multilevel CGH has serious undesirable consequences. As the phase modulation depth decreases, the diffraction efficiency does decrease but an additional diffracted pattern appears in the form of a reversed copy of the desired pattern. In practice, the strength of this reversed copy eliminates the advantage of multilevel phase holograms.

Referring to FIG. 4, a view of the scene through a multilevel phase CGH far field transmission hologram is illustrated. In this view, an undesired symmetric diffraction pattern has been eliminated so that only a desired diffraction pattern 422 is seen adjacent a bright compact light source 416. Elements of the natural scene are blurred as represented by blurred images 424.

Thus, an alternative form of the multilevel phase CGH is needed to balance see-through performance with the desired holographic reconstruction without introducing additional undesired diffracted light.

U.S. Pat. No. 5,210,625 and U.S. Pat. No. 5,278,008 disclose a multi-step process for modifying the diffraction efficiency of optically generated holograms without adjusting the contrast transmittance or the phase modulation depth over the whole hologram area. The disclosures of these patents are directed to beam splitting and redirecting holograms. They are silent regarding far field holograms, as well as information bearing holograms.

The process disclosed by the '625 and '008 Patents is not applicable to far field viewing devices. The disclosed aspect of introducing an unresolvable pattern of clear regions may be workable for image plane and Fresnel holograms when attention is focused at or near the plane of the hologram and may be useful for some beam redirection applications for which it is taught. However, the '625 and '008 disclosures do not recognize that the apertures defining the clear regions contribute to undesired diffracted light as well as un-diffracted light. The practical result is that the teachings of the '625 and '008 Patents cannot be applied to far field viewing applications because the small size of the unresolvable regions produces undesirable diffraction artifacts that compete with the desired reconstructions of far field holograms when bright compact sources of light are present in the scene.

Furthermore, the process of introducing unresolvable flat regions as the '625 and '008 Patents can introduce undesirable degradation in the see-through performance of holograms creating a blurred scene. The prior art concept of resolving the flat regions really loses meaning for holograms that are situated near the pupil of the eye as in the case of many far field viewing devices. Thus, different considerations are needed.

Moreover, the multi-step process disclosed by the '625 and '008 Patents is cumbersome and is not appropriate for computer generated holography.

What would be useful would be far field viewing devices incorporating holograms with diffraction efficiency adjusted to provide robust control over the balance between the clarity of the scene and the brightness of the holographic light pattern appearing at each bright point of light while minimizing undesired diffracted light patterns.

SUMMARY OF THE INVENTION

It is an object of the present invention to provide a far field hologram viewing device.

It is another object of the present invention to provide a method of manufacturing a far field hologram.

It is yet another object of the present invention to provide a far field hologram viewing device through which a scene may be viewed by an observer in combination with holographic diffracted light patterns at each bright point source of light present in the scene.

It is still another object of the present invention to provide a far field hologram viewing device which produces a desired reconstruction pattern that is not accompanied by a copy of the pattern that is rotated by 180 degrees about an un-diffracted component.

It is an object of the invention to provide a robust approach to controlling diffraction efficiency of far field holograms in order to achieve a balance between the clarity of the scene and the brightness of the holographic light pattern appearing due to each bright point of light while controlling undesired diffracted light patterns.

It is another object of the invention to control the diffraction efficiency for multilevel phase computer generated holograms that are not limited to producing symmetrical holographic light patterns, and therefore allow for larger and more detailed diffracted light patterns than are possible with amplitude holograms and binary phase holograms.

It is yet another object of the invention to establish a procedure that is consistent with established cost-effective hologram fabrication processes.

It is a further object of the invention to provide the balance between the clarity of the scene and the brightness of the holographic light patterns without requiring a tight tolerance on the relative positions of the hologram and an observer's eye.

The present invention includes far field viewing devices employing novel reduced diffraction efficiency far field holograms having regions of spatially varying diffraction efficiency to provide robust control over the balance between scene clarity and holographic light pattern brightness.

This invention pertains to the design of optimized far field viewing devices that simultaneously produce bright far field holographic light patterns and achieve good see-through performance to present a well focused scene. The implementation of the hologram is critical to achieve the desired viewing conditions.

Some of the above objects are obtained by a viewing device for viewing by a user. The device includes a support structure and a far field transmission hologram. The far field transmission hologram is supported by the support structure, and the far field transmission hologram has a graphic image encoded therein. When the support structure is disposed in a viewing position of the user, the graphic image is superimposed, with substantially no reversed diffracted copy of the graphic image, on a natural scene as viewed by the user through the hologram. The superimposed graphic image and the natural scene are viewable by the user in combination with substantial clarity.

Some of the above objects are also obtained by such a viewing device where the support structure takes the form of a spectacle frame having lens apertures. The far field transmission hologram is disposed in one or both of the lens apertures of the frame.

Others of the above objects are obtained by an optical device having a reflective far field hologram, where the hologram is a fill factor modulated far field hologram.

Certain of the above objects are obtained by a method of generating a far field transmission hologram. The method includes the step of altering an optical property of a substrate to form a substantially shift-invariant far field hologram that has a graphic image encoded therein. The alteration of the optical property produces a high diffraction efficiency. The method also includes the step of substituting a low diffraction efficiency pattern for at least one selected region of the far field hologram.

Some of the above objects are also obtained by a filter for use with a camera that has a light gathering path and an image sensor. The filter includes a far field transmission hologram that has a graphic image encoded therein. The far field transmission hologram is adapted for mounting in the light gathering path. When the far field transmission hologram is mounted in the light gathering path, the graphic image is superimposed, with substantially no reversed diffracted copy of the graphic image, on a natural scene as viewed by the image sensor through the hologram. The superimposed graphic image and the natural scene are viewable by the image sensor in combination with substantial clarity.

BRIEF DESCRIPTION OF THE DRAWINGS

Additional objects and advantages of the present invention will be apparent in the following detailed description read in conjunction with the accompanying drawing figures.

DETAILED DESCRIPTION OF THE INVENTION

Figure 1:
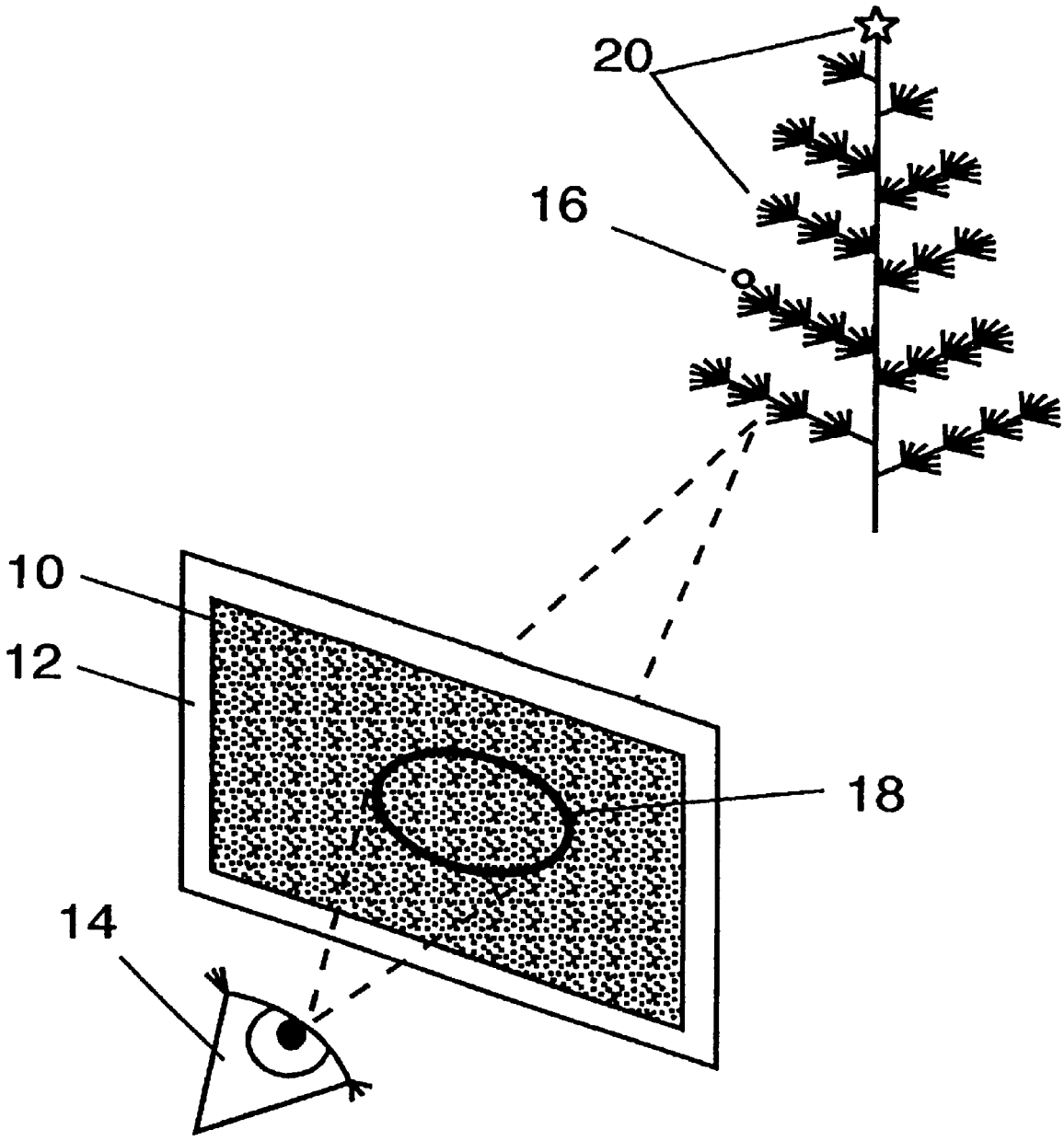
FIG. 1 illustrates schematically a human observer looking through a far field viewing device.
Figure 2:
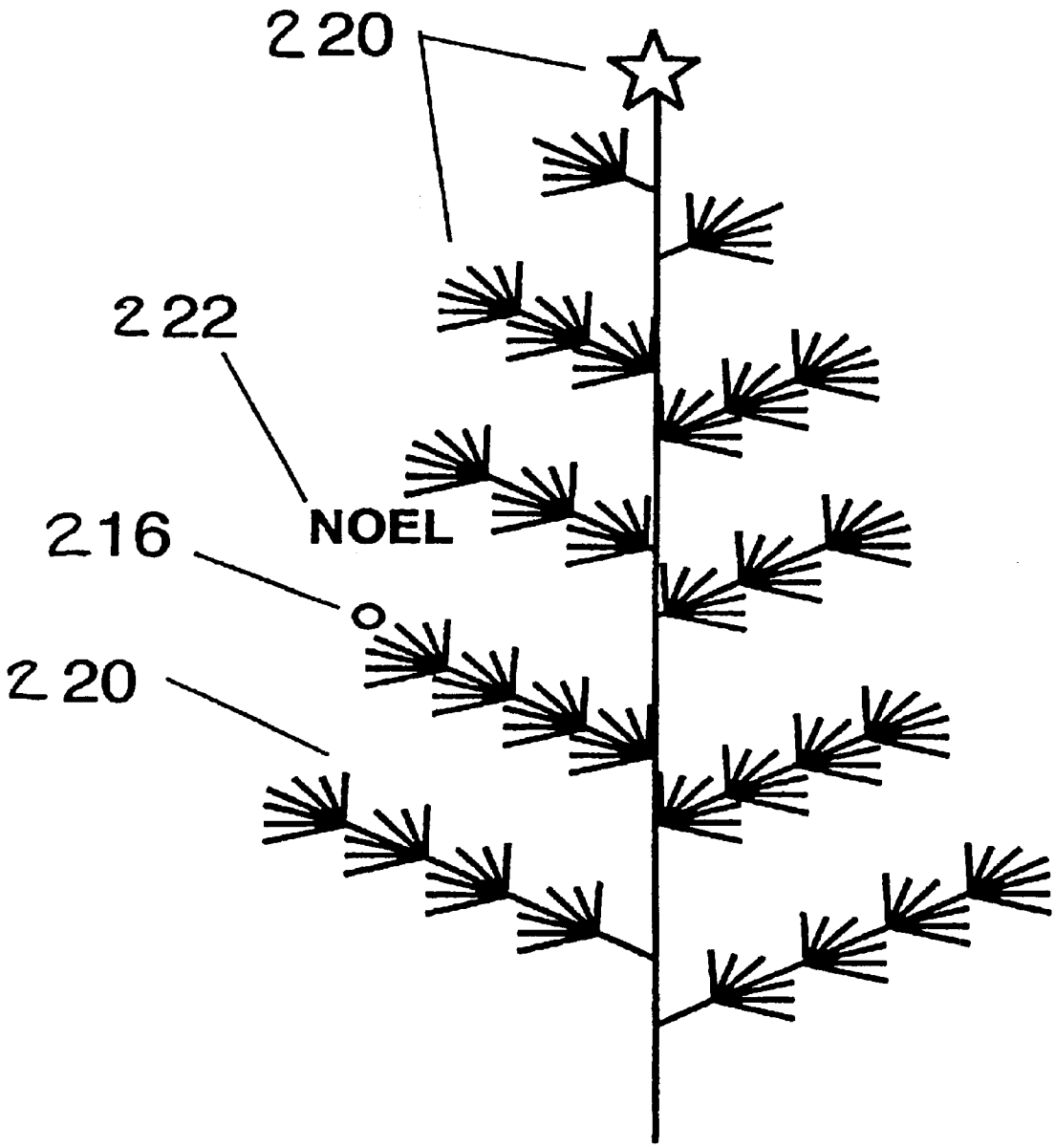
FIG. 2 illustrates a view for an observer of a scene while looking through an ideal far field viewing device.
Figure 3:
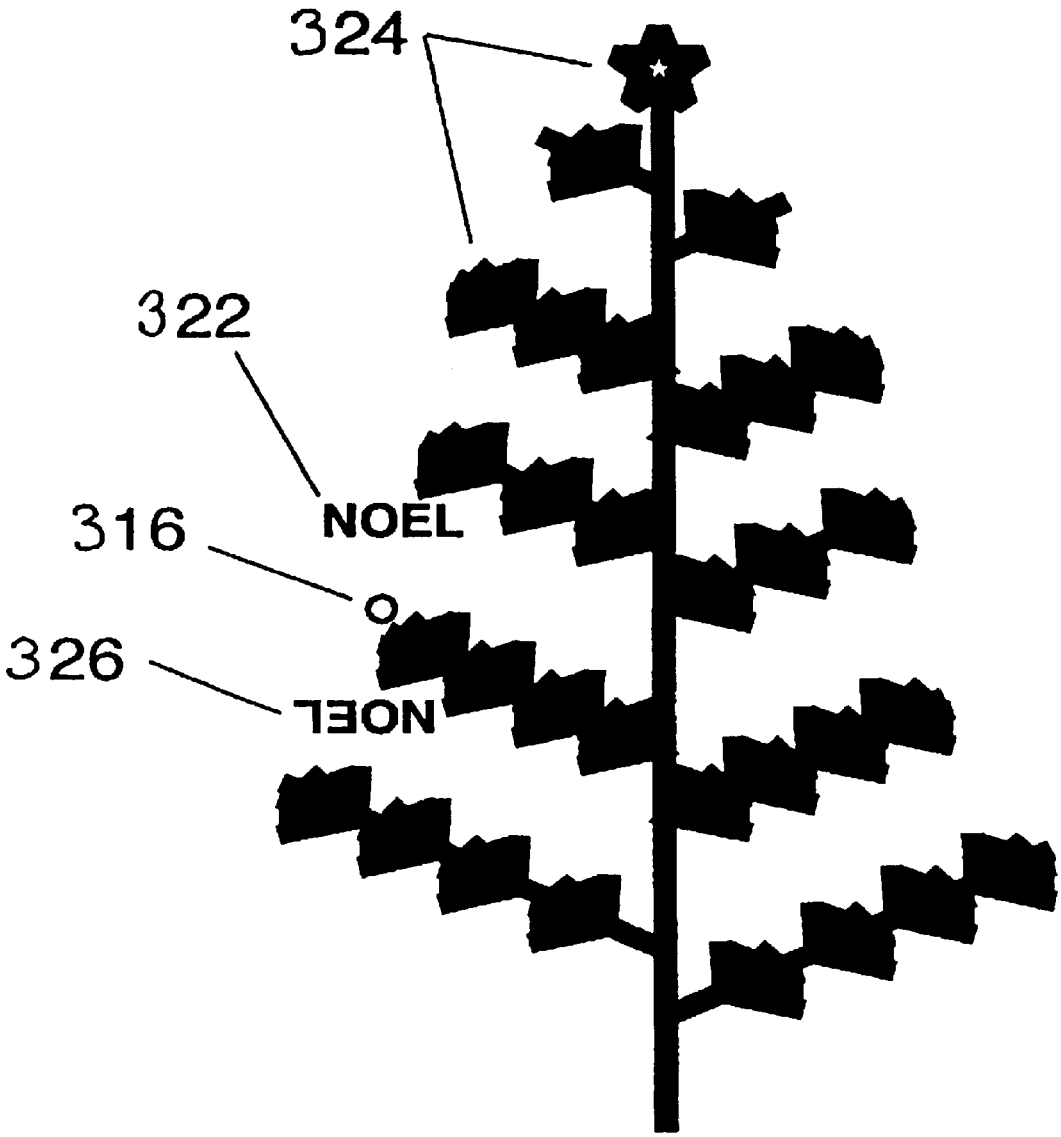
FIG. 3 illustrates a view for an observer of a scene while looking through a high diffraction efficiency far field hologram.
Figure 4:
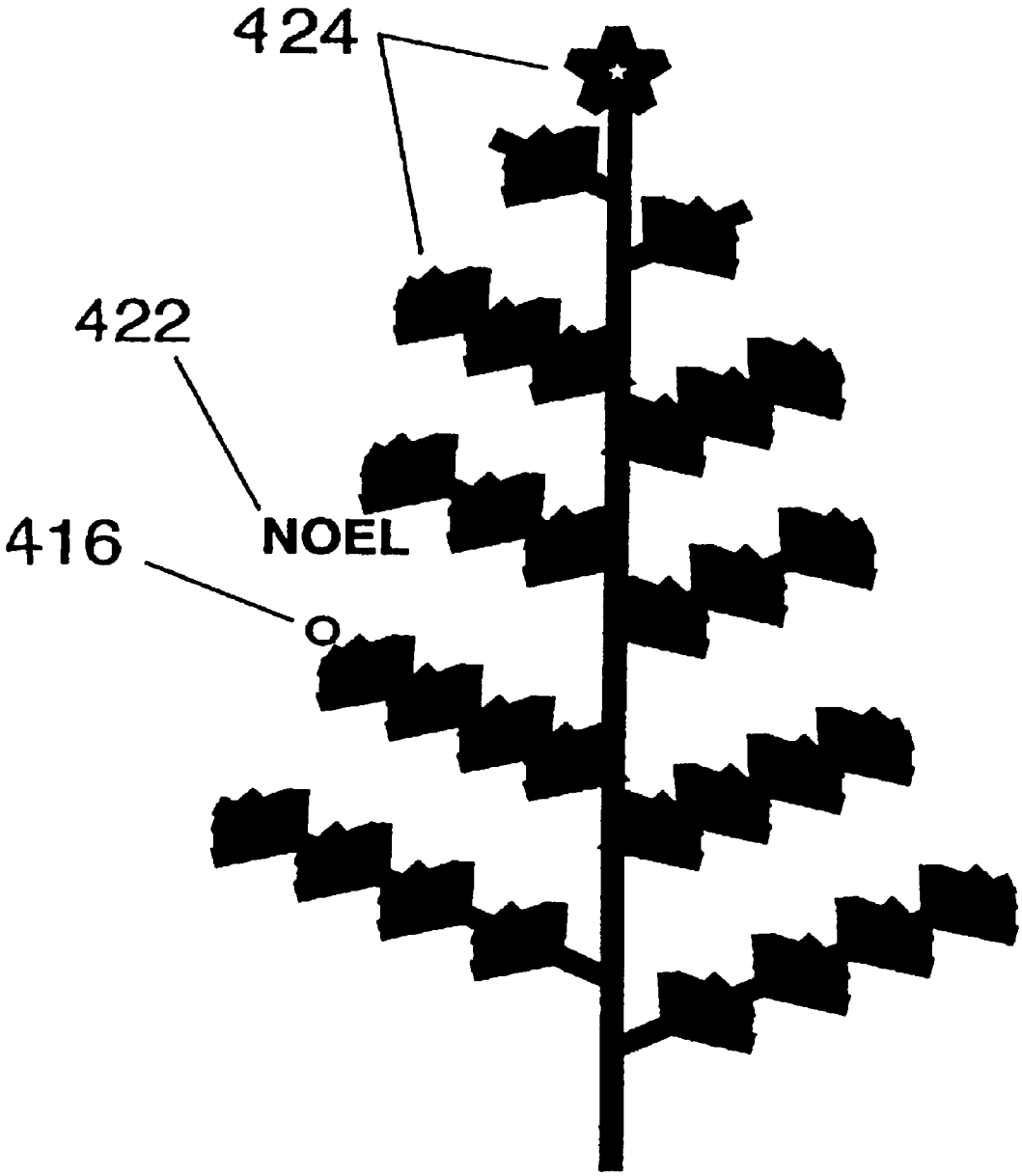
FIG. 4 illustrates a view for an observer of a scene while looking through a conventional multilevel phase CGH.

A standard far field hologram is typically optimized to create maximum brightness holographic light patterns and consists of highly diffracting regions over the face of the entire hologram. According to the present invention, a far field viewing device includes a hologram with a diffraction efficiency chosen to balance the clarity of the scene with the brightness of the holographic light reconstructions.

The desired clarity of the scene is such that the natural scene can be appreciated without undue effort. In other words, it is desired that the observer still be able discern the aesthetic qualities of the natural scene while looking through the far field transmission hologram. Good tests for scene clarity (since aesthetic discernment is too cumbersome to evaluate) assess how well an observer can read while looking through the holograms. A near-reading test is to determine whether the observer looking through the holograms can still read text of a standard publishing font size at what would ordinarily be a comfortable reading distance for that person. A far-reading test is to determine whether the observer looking through the holograms can make out street signs and road signs without undue effort. Alternately, standard comparative visual acuity tests would be useful in evaluating whether vision of scenery through the far field transmission holograms is substantially clear if it meets an objective standard, e.g., a "20/40" standard.

According to one embodiment of the present invention, the local diffraction efficiency of the far field hologram is modified in a systematic way. Far field holograms intended for far field viewing applications are typically designed to exhibit shift-invariance. This means that as the far field hologram is translated laterally with respect to an illuminating beam of light, the intensity distribution of the diffracted light pattern does not change substantially. This also means that the entire hologram need not be illuminated to produce the desired diffracted pattern. In practice, illuminating a very small portion of the hologram will still reproduce the entire diffracted pattern. Note that if the portion is made too small, the quality of the diffracted light pattern will degrade excessively. We define a unit hologram region as the smallest portion of the overall hologram that produces an acceptable quality diffracted pattern. Preferably, far field holograms used for far field viewing applications are composed of spatially repeated copies of a unit hologram.

Similarly, for a fixed position hologram, the eye can make small rapid movements without changing the diffracted light pattern. This shift-inverted property is generally desirable so that the viewer does not need to maintain a rigidly fixed position with respect to the hologram.

In the case of a far field hologram illuminated by a beam of light, shift-invariance means that as the far field hologram is translated laterally with respect to an illuminating beam of light, the intensity distribution of the diffracted light pattern does not change substantially.

This also means that the entire hologram need not be illuminated to produce the desired diffracted pattern. In practice, illuminating a very small portion of the hologram will still reproduce the entire diffracted pattern. As regions smaller than a unit hologram region are illuminated, the quality of the diffracted pattern degrades, but the strength of the diffracted light does not change except for small random variations as the hologram is moved with respect to the beam. In other words, the diffraction efficiency remains constant even for illuminated regions smaller than the unit hologram as the hologram is translated laterally with respect to the illuminating beam. The constant diffraction efficiency property holds as long as the illuminated region is sufficiently large. We define the minimum probe area as the smallest allowable size that maintains the constant diffraction efficiency property. The diffraction efficiency of a typical hologram for far field viewing devices remains constant except for some small random variations as the hologram is moved with respect to a minimum probe diameter illuminating beam. In practice, the minimum probe diameter is typically less than ten pixels wide in a CGH, where a pixel is the smallest addressable spatial region in the CGH.

The observer does not make use of the whole hologram when the hologram subtends a larger angle than the angular field-of-view of the human eye (or any other visual sensor, by analogy). We define that each point in the scene is viewed through a utilized hologram area 18 determined by the angular field-of-view of the eye and the distance from the eye to the hologram.

Many minimum probe diameter regions fit within the utilized hologram area 18 of a hologram designed for far field viewing applications. The effective diffraction efficiency of the hologram is the average of the diffraction efficiencies of all of the minimum probe diameter regions that comprise the utilized hologram area. In a conventional far field hologram, the individual diffraction efficiencies of the minimum probe diameter regions are identical except for small random variations.

The present invention employs a novel form of a far field hologram having systematically locally varying diffraction efficiency. This locally varying diffraction efficiency is preferably manipulated to create a particular desired effective diffraction efficiency when averaged over an area corresponding to the utilized hologram area 18 (refer to FIG. 1). We call this novel hologram a Spatially Varying Diffraction Efficiency Far Field (SVDEFF) hologram.

Figure 5:
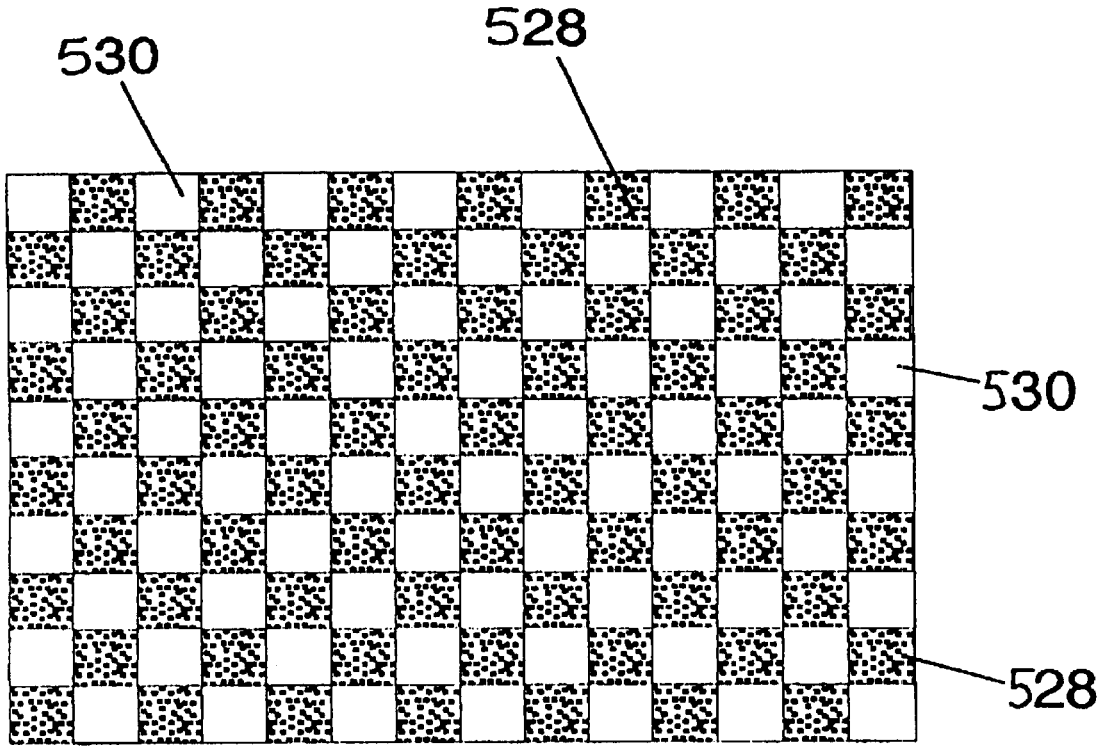
FIG. 5 illustrates an SVDEFF hologram.

Referring to FIG. 5, an SVDEFF hologram is illustrated. The SVDEFF hologram is made up of intentionally high diffraction efficiency regions 528, which generate the desired diffracted light patterns, and low diffraction efficiency regions 530, which possess low diffraction efficiency and generate another set of weakly diffracted light patterns. The size of the low efficiency regions only needs to be small with respect to the utilized hologram area 18 and is much larger than the minimum probe diameter area of a standard shift-invariant far field hologram. The size of the intentionally low efficiency regions can even be much larger than the unit hologram area provided that the unit hologram area is small with respect to the utilized hologram area.

According to one embodiment of the present invention, a special case of the SVDEFF hologram that we call a Fill Factor Modulated Far Field (FFMFF) hologram is utilized. In such FFMFF holograms, the low diffracting regions 530 are highly transmissive and nearly optically flat regions with effectively zero diffraction efficiency. The fill factor is the percentage of the holographic surface that contains the intentionally high diffracting regions. Introducing low diffracting regions 530 can be likened to punching holes through the hologram. The size, shape and distribution of the low diffracting regions 530 are important design parameters that affect the usefulness of the resultant holograms in the context of a far field viewing device.

When the size, shape and distribution of the low diffracting regions 530 are chosen appropriately, the primary effect is to lower the brightness of the holographic light patterns while simultaneously increasing the scene clarity. Control over the percentage fill of the diffracting region of the hologram over the utilized hologram area 18 controls the effective diffraction efficiency of the hologram and adjusts the balance between holographic light pattern brightness and the scene clarity. Increasing the fill factor increases the effective diffraction efficiency and tends to brighten the diffracted light patterns at the expense of scene clarity. Decreasing the fill factor decreases the effective diffraction efficiency and tends to increase scene clarity at the expense of reducing the brightness of the diffracted light patterns.

In addition to the primary effect of increasing scene clarity, the addition of low diffracting regions 530 creates a secondary effect of introducing undesired diffracted light patterns that distract from the desired holographic reconstructions. This can be understood by considering diffraction by a mask that is clear in the regions corresponding to the low diffracting regions 530 of an FFMFF hologram and opaque in the regions corresponding to the high diffracting regions 528. Such a mask will produce a unique far field diffraction pattern corresponding to the shape of low diffracting regions 530. This same diffraction pattern will be produced by the corresponding FFMFF [hologrartad] *hologram and* in many cases will distract from the desired holographic reconstruction. In the example of FIG. 5, the low diffraction efficiency regions 530 are regularly spaced square regions.

Figure 6:
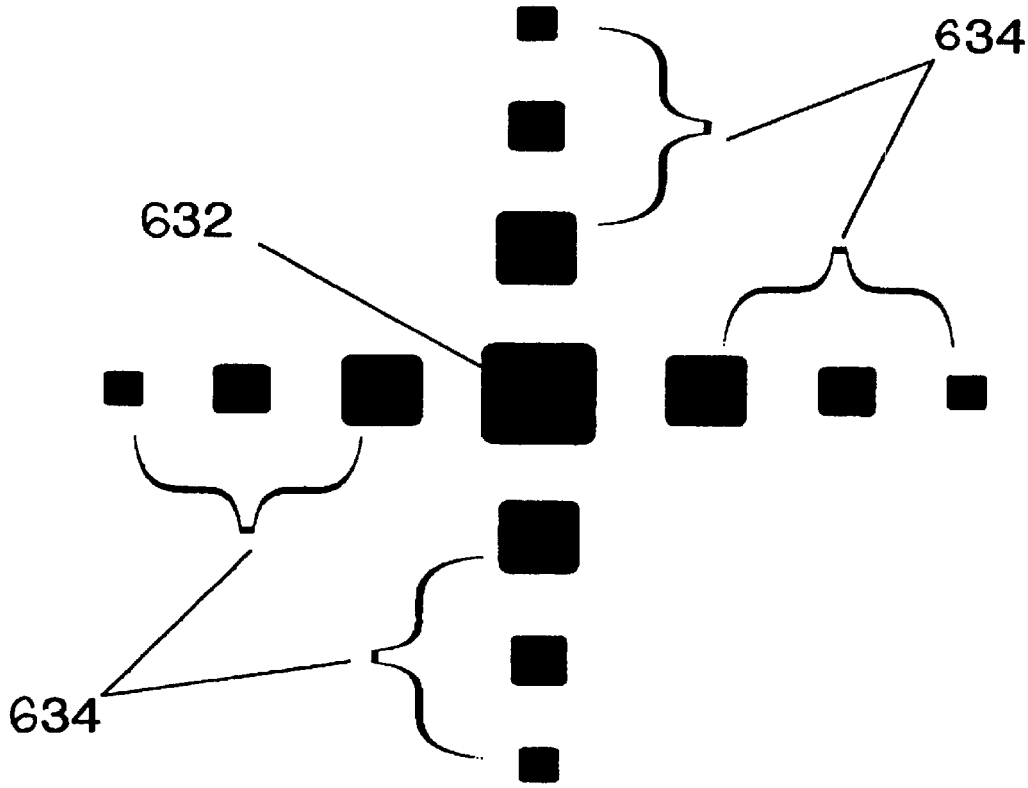
FIG. 6 illustrates a diffraction pattern produced by a square aperture.

Referring to FIG. 6, a far field diffraction pattern is illustrated. A clear square aperture produces a far field diffraction pattern and consists of a main central spot 632 and multiple diffracted spots 634.

Figure 7:
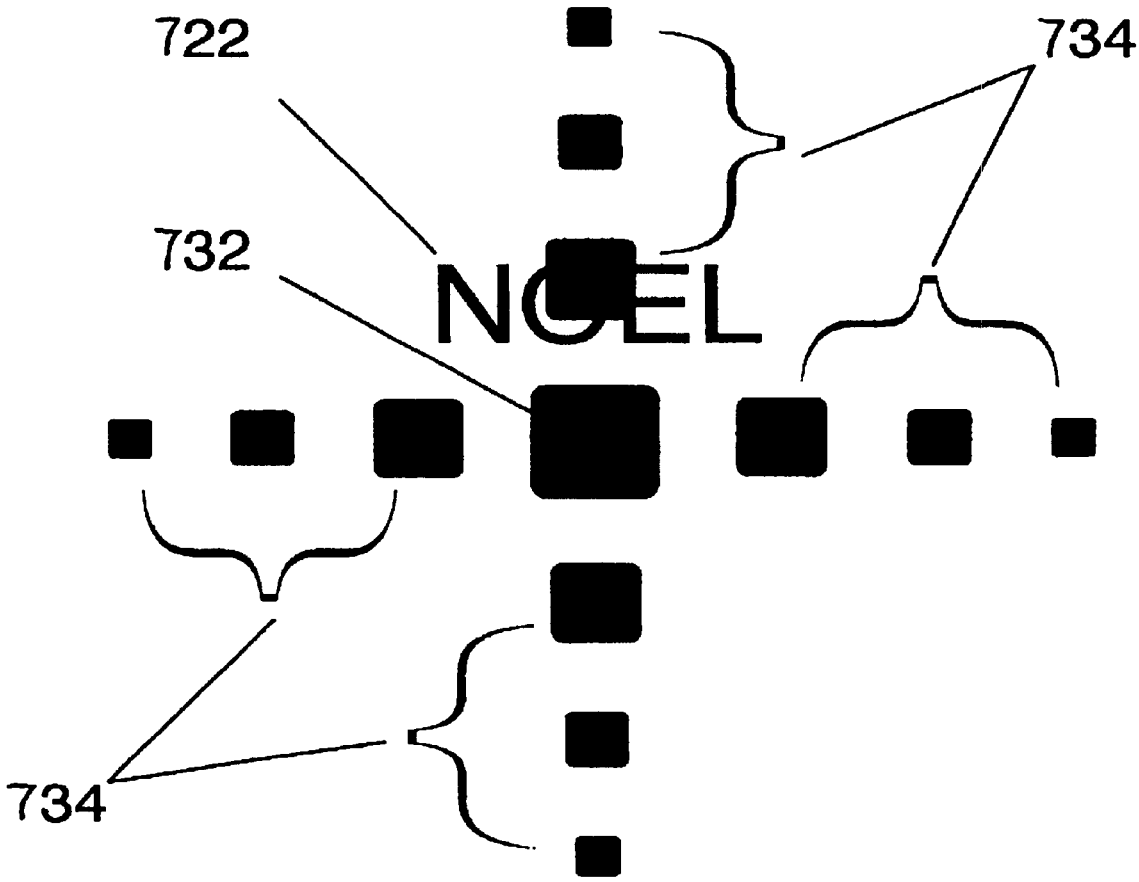
FIG. 7 illustrates a diffraction pattern produced by a multilevel phase FFMFF hologram with small square low-diffraction regions.

Referring to FIG. 7, a view of a single compact point of light as seen through an FFMFF hologram with square low diffracting regions with inappropriate sizes is illustrated. An undesired diffracted pattern corresponding to the square low diffracting regions is shown consisting of a main central spot 732 and unwanted diffracted spots 734 as well as a desired diffracted light pattern 722 produced by high diffraction efficiency regions. The lack of an unwanted mirror image of the desired diffracted pattern implies that the high diffracting regions are in the form of a multilevel phase CGH. The unwanted diffracted spots 734 can be very bright in practice and distract from the appearance of desired diffracted pattern 722.

One solution to the problem of the distracting undesired diffracted pattern is to reduce the size of the square low diffracting regions in order to increase the spacing between the undesired diffracted spots so that the first unwanted diffracted spot is out beyond the extent of desired diffracted light pattern 722. In the specific case of the grid of square low diffracting regions, the designer would then decrease the size of the individual squares while attempting to maintain the same overall percentage fill factor by appropriately reducing the spacing between regions. The choice of very small regions can push unwanted diffracted spots 734 further out beyond the extent of the desired diffracted light pattern 722. However, the central spot 732 of the undesired diffraction pattern broadens and corresponds to serious degradation in see-through performance and is manifested as considerable blurring of the scene.

We prefer to make the low diffracting regions 530 as large as possible. The effect of sufficiently large low diffracting regions 530 is to make the overall undesired diffraction pattern small with respect to the desired diffracted light pattern 722 thus minimizing the distraction. Simultaneously, the central spot 732 of the undesired diffraction pattern narrows and this results in practice in improved see-through performance leading to a sharper focus of scene elements.

Figure 8:
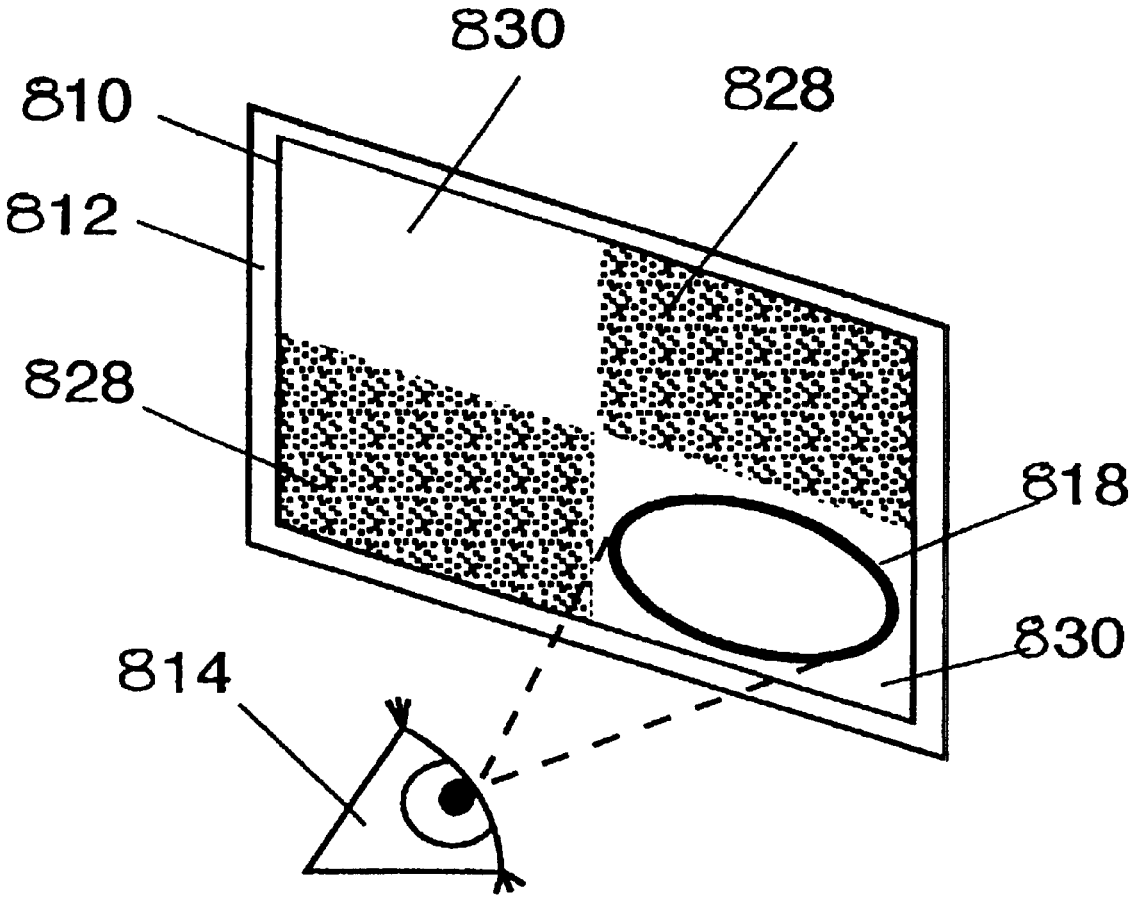
FIG. 8 illustrates a view for an observer looking through a far field viewing device employing FFMFF hologram with excessively large low diffracting regions.

Although we prefer making low diffracting regions as large as possible, the size cannot be increased without limit. The upper limit on the size is illustrated, referring to FIG. 8, where a large low diffraction region size relative to the utilized hologram area 818 has been chosen and the spacing has been chosen to preserve a fifty percent fill factor. The utilized hologram area 818 is determined by a number of factors including the size of the pupil of the eye 814 and the distance between the eye and the far field viewing device (a hologram 810 mounted in a frame 812). When the hologram 810 is situated within a few centimeters of the eye 814, the utilized hologram area 818 is relatively small and, as shown in FIG. 8, the observer looks only through a low diffracting region 830 when one of the apertures is co-centered with the center of the pupil of the eye. In that case, the resultant effective fill factor over the utilized hologram area is zero and the observer will see no holographic light reconstructions. The other extreme occurs when the hologram 810 is shifted laterally such that the field-of-view of the eye only permits highly diffracting regions 828 of the hologram 810 to affect the view. In that case, the resultant effective fill factor is 100 percent and the view of the scene elements will be blurred. Other spatial shifts of the hologram 810 of FIG. 8 relative to the eye 814 will produce different effective fill factors.

It is desirable to have an effective fill factor that is independent of the relative position of the eye and the hologram. In order to achieve a position independent effective fill factor, the size of the low diffracting regions and the repeat spacing should be chosen such that several low diffracting regions are contained within each utilized hologram area. According to the preferred embodiment, the number of low diffracting regions contained in the utilized hologram area is in the range of about five or more.

In addition to choosing an effective size, the shape of the low diffracting regions should also be selected to further decrease the distracting effect of undesired diffracted light. It is desirable to use low diffracting region shapes that spread the diffracted energy out over a larger area rather than producing concentrated spots of undesired diffracted energy. As an example, circular low diffracting region shapes spread the undesired diffracted energy into rings of light surrounding the main central spot that have lower energy values per area than do the spots diffracted by comparable size square low diffracting regions.

Figure 9:
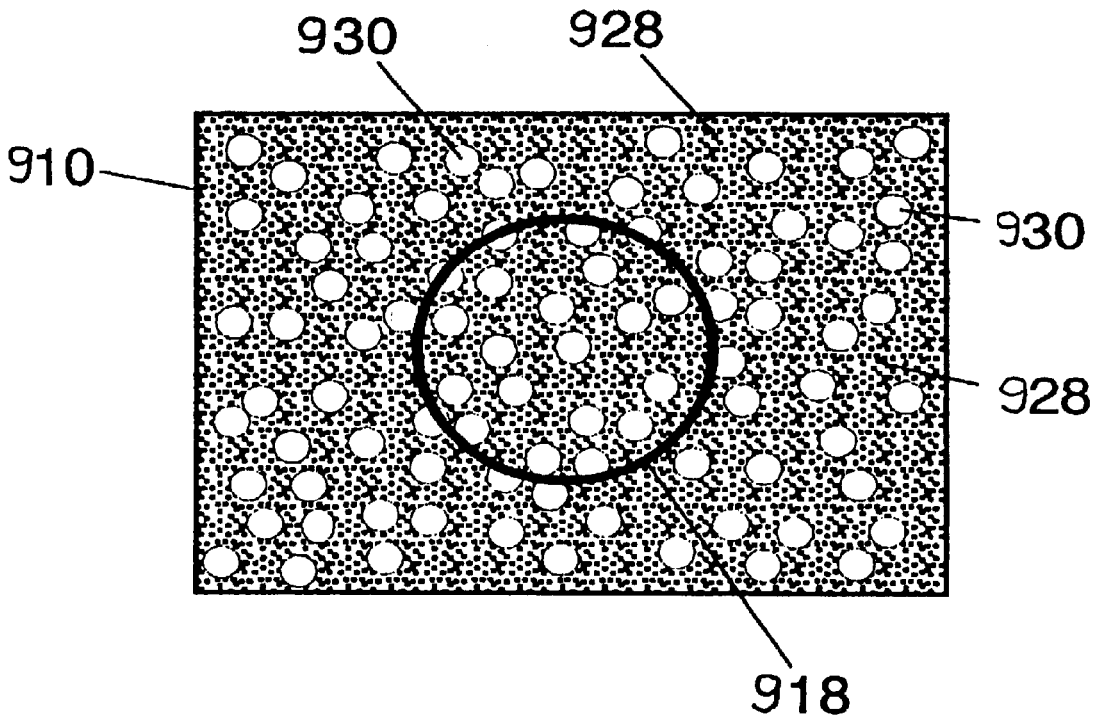
FIG. 9 illustrates a view of an FFMFF hologram according to a preferred embodiment of the present invention.

Referring to FIG. 9, a preferred embodiment of an FFMFF hologram 910 with circularly shaped low diffracting regions 930 distributed across a region of high diffraction efficiency 928 is illustrated. In this illustrated embodiment, over sixteen low diffracting regions 930 fall inside a utilized hologram area 918. Alternatively, the shapes of the low diffracting regions may be carefully chosen such that any diffracted light would fall on bright regions of the desired holographic reconstruction and hence create minimal distraction.

Figure 10:
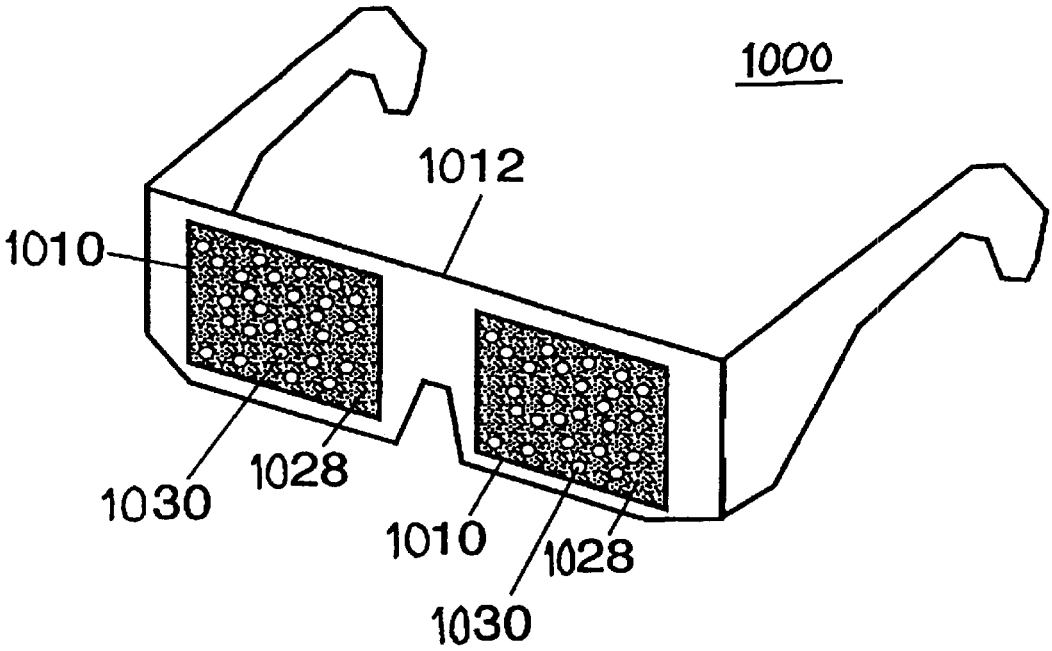
FIG. 10 illustrates a controlled diffraction efficiency far field viewing device wherein FFMFF holograms are incorporated into the lens apertures of a spectacle frame according to a preferred embodiment of the present invention.

Referring to FIG. 10, a preferred embodiment of a controlled diffraction efficiency far field viewing device 1000 is illustrated, wherein FFMFF holograms 1010 are incorporated into the lens apertures of a spectacle frame 1012. Each of the FFMFF holograms 1010 has a distribution of both high diffraction efficiency regions 1028 and low diffraction efficiency regions 1030. The combination of FFMFF holograms 1010 with spectacle frames 1012 provides a viewing device 1000 that very naturally prompts a person to don the device so that the holograms are juxtaposed with respect to the person's eyes for easy viewing of the natural scene combined with the holographic images produced by the holograms.

The distribution of the low diffracting regions 1030 is preferably tailored to optimize the far field viewing device

1000. A regular grid of apertures produces a sampling effect in the diffraction pattern that manifests itself as a fine grid structure superimposed on the diffraction pattern. An irregular spacing of the apertures (as shown in FIG. 10) reduces this sometimes distracting sampling effect.

A practical design example is given below to illustrate the design considerations given above. Consider a computer generated multilevel phase far field hologram designed to produce an asymmetric holographic reconstruction around each bright point of light when incorporated into a far field viewing device. The device may be embodied in many forms including an eyeglass worn or held close to the eye or a window mounted device. In the case of the window mounted device the observer might stand as close to the window as possible, so a choice of approximately two centimeters between the eye and the hologram is appropriate for the cases of both the eyeglass and the window application. Such a design approach for the window mounted hologram will also work when the observer is far from the hologram. The choice of a small utilized hologram area is a conservative one. In an application that precludes the observer from standing very close to the window, larger low diffracting regions can be used.

For multilevel phase holograms produced with known fabrication methods, a fill factor ranging from about 50 to 80 percent is preferred as producing a pleasing balance between scene clarity and reconstruction brightness. Selection of a most preferred value from within this general range depends on the ambient light level in the scene, the nature of the holographic reconstruction and subjective interpretation of the viewers.

According to a working example, we use the particular goal of 75 percent fill factor. According to our empirical data, for a screen placed two centimeters from the eye, a typical human viewer looks through a utilized hologram area 18 having a size of about 1 cm in diameter. A reasonable design for SVDEFF holograms employs circular low diffracting regions 30 having a diameter of 1 mm and a mean center-to-center spacing of approximately 1.8 mm. A 1 cm diameter utilized hologram area will allow approximately 25 such low diffracting regions to contribute to the view of the scene. This configuration produces an effective fill factor that remains close to 75 percent even when the hologram is translated laterally with respect to the eye. The diameter of the circularly shaped low diffracting regions proves to be sufficiently large to concentrate the undesired diffraction pattern such that it creates minimal distraction from typical holographic reconstructions.

Physical fabrication of an SVDEFF CGH takes advantage of established CGH fabrication methods without any need for nonstandard modifications. Instead, the distribution of the low diffracting regions can be incorporated directly into the computer generated hologram data prior to fabrication. In general, computer generated holograms are produced by using numerical algorithms to calculate phase and amplitude transmittance values that will result in a desired far field diffraction pattern.

Each value corresponds to the desired transmittance at a different spatial location on the physical hologram. The resultant data set is used to drive any of a variety of fabrication methods that impose the desired transmittance values onto a physical substrate. In order to create the special case of an FFMFF CGH, a standard far field hologram algorithm is initially employed to generate a data set to produce a standard shift-invariant and highly efficient far field hologram. The designer then determines the necessary fill factor to lower the effective diffraction efficiency by the desired amount. Then the size, shape and distribution of the low diffracting regions are determined. Finally, data values corresponding to the low diffraction regions of the FFMFF CGH are set to unity transmittance with a constant relative phase. The modified data set is then used as the input to a standard CGH physical fabrication procedure.

Optionally, in the event that the cost of manufacturing individual holograms in this manner is excessive, the hologram is used as a master and copied or replicated using a variety of techniques. As an alternative, a standard far field hologram is used as a master and the replication procedure is modified to introduce the low diffracting regions at the replication stage.

The above-described procedure permits a hologram producer to choose the size, shape and distribution of the low diffracting regions according to the guidelines described. However, the present invention is not limited to a production method that incorporates so much human input. The present invention encompasses production procedures where an automated algorithm incorporates the design of the size, shape and distribution of the low diffracting regions into the calculation of the hologram. Such an automated approach would also provide the improvements in the effectiveness of SVDEFF CGH's according to the various embodiments of the present invention.

Similarly, a CGH designer can arrive at an SVDEFF hologram approximating an FFMFF hologram in an indirect fashion without directly incorporating the low diffracting regions into the hologram characteristics. Such an indirect method is achieved by specifying the overall hologram reconstruction as a combination of the desired diffracted pattern and a weak diffraction pattern such as might be expected from the circular low diffracting regions of an FFMFF hologram. A well implemented algorithm would ultimately converge to a subclass of an SVDEFF hologram having substantially low diffracting regions distributed throughout the otherwise high diffraction efficiency hologram. These indirectly designed holograms would differ from an FFMFF hologram in that the transitions from low diffraction efficiency regions to high diffraction efficiency regions would tend to be less sharp than the transitions of the simpler FFMFF special case.

There are numerous variations possible according to alternate embodiments of the basic embodiments described above. These various embodiments are grouped according to the aspect of the resultant device that they pertain to. This list is meant to be illustrative and not exhaustive. Furthermore, numerous combinations can be constructed by taking different variations from each of the aspects discussed below.

A first class of alternate embodiments is based on variations of the high diffraction regions of the hologram.

Although the above description emphasizes multilevel phase CGH's in the specification, the method also applies to binary and continuous amplitude CGH's, binary phase CGH's and all optically recorded far field holograms. Since the maximum diffraction efficiency obtained with each of these different processes of producing holograms is significantly different, the corresponding optimum fill-factors will also be significantly different.

According to an alternate embodiment, the high diffraction regions that contain the far field holograms for generating the desired light patterns are themselves spatially varying. Thus, different high diffraction efficiency regions of the hologram could produce different light patterns. Such a configuration, as a natural result, causes an observer to see different light patterns in different parts of the scene.

Some alternate embodiments are based on various ways that the image generation is conditioned upon the frequency of light of the light source impinging the hologram. Multi-level phase far field holograms can be made to respond in a color selective manner if the phase modulation is chosen correctly. For example, a multi-level far field hologram that has been designed to work with red light will create a holographic image only when a point-like light source of red color is viewed through it. For all other colors, the hologram will not produce the encoded holographic image. Similarly the optical phase modulation can be adjusted so that the hologram responds to blue or green light. A single far field hologram can then contain regions that are turned to lights of different colors in producing different images. When a white light point source is viewed through such a hologram, it will produce a multi-color image that is a superposition of individual images encoded in far field holograms tuned to different colors. The technique for describing the design of a color-selective far field hologram by adjusting optical phase modulation has been described by Barton, Blair and Taghizadeh. See Ian M. Barton, Paul Blair, Mohammad R. Taghizadeh "Dual-Wavelength Operation Diffractive Phase Elements for Pattern Formation", OPTICS EXPRESS, vol. 1, no. 2 (July 1997)(published on the Internet). Holograms incorporating these color selective effects are not inconsistent with the present invention, and alternate embodiments of the present invention include appropriate phase modulation to effect such color selective effects.

The present invention may also be optionally embodied using so-called "volume" hologram construction. Holograms can be recorded in materials that are thicker than several hundred micrometers. Such holograms have special properties and have been discussed for display applications and optical storage applications for a number of years. See J. W. Goodman, INTRODUCTION TO FOURIER OPTICS, McGraw Hill (2d ed. 1996). Such holograms when reconstructed suppress the conjugate image. In addition, these holograms can display color selective and angle selective behavior. This means that volume holograms recorded with certain angle between the object and the reference wave will reconstruct only when illuminated with a reconstruction wave impinging at an appropriate angle. This property is utilized in a far field hologram viewing device according to the present invention in the following way. Multiple holograms of different images are recorded with reference beams coming at different angles. When this composite hologram is used in viewing point sources located at different positions, the holographic image reconstructed will depend on the location of the point source. This leads to an enhanced viewing experience by generating several independently recorded images to appear for light sources at different positions in the scene.

A second class of alternate embodiments is based on variations of the low diffracting regions of the hologram.

The individual low diffraction regions need not all have the same shape and size. Thus, according to one alternate embodiment, circles are mixed with polygons of varying sizes in a single SVDEFF hologram.

Moreover, the shapes need not be restricted to simple geometric patterns. Thus, another alternate embodiment employs a mix of low diffraction efficiency regions that are shaped like various alphanumeric characters or graphic images. This results in an added benefit of creating an esthetically pleasing appearance when viewed.

Although the low diffracting regions are described above as being optically flat, the low diffraction regions need not be perfectly optically flat in order to practice the present invention. Fabrication limitations arising in mass production cause the low diffraction regions to vary from being perfectly optically flat.

In addition to unintentional deviations from optical flatness, one alternate embodiment calls for the low diffracting regions to have intentionally imposed phase profiles in the form of weakly diffracting patterns. For example, the weakly diffracting pattern is embodied as high frequency gratings that produce attractive light patterns beyond the extent of the desired diffracted light pattern. Thus, the low diffraction efficiency region can be utilized to augment and enhance the main light patterns without introducing unacceptable loss in the see-through image quality of the scene.

According to yet another alternate embodiment, the low diffracting regions have a phase profile produced by an indirectly computed SVDEFF.

According to a further alternate embodiment, the low diffracting regions have a gradually varying amplitude transmittance as opposed to a uniform transmittance.

One way to embody the low diffracting regions of the present invention is to intentionally introduce gaps between small unit holograms.

A third class of alternate embodiments is based on variations of the design and construction of the far field viewing device.

The viewing device may be embodied as having two distinct eye openings, one for each of a viewer's two eyes. In this case, the high diffraction portions of the respective holograms for the left and right eye are optionally embodied as a stereo pair. The use of a stereo pair generates a depth effect on the light pattern.

It is permissible to embody the frame that holds the far field device that places a hologram between the scene and the observer's eye in a variety of forms. The frame is alternately embodied as eyeglass frames, jewelry, bookmarks, greeting cards, and frames for mounting in (or on) windows.

According to another alternate embodiment, the far field device is incorporated into an imaging system. Examples of imaging systems that will embody the present invention are binoculars and telescopes. Use of far field devices according to the present invention is not limited to any specific type of imaging system and may be incorporated into any of a variety of possible configurations that interpose a far field hologram between the observer's eye and the scene.

According to one embodiment, the far field device is incorporated in or near the pupil plane of an imaging system that has a solid-state detector or film as the final detection plane rather than a human eye. Some examples of such devices are film-based still or movie cameras, as well as still or motion cameras utilizing solid-state type detectors.

The far field holograms described above worked using transmitted light. Holograms according to the present invention may also be embodied so as to work with light reflected from them. An important consideration for designing such reflective far field holograms is to account for the double optical pass through the hologram. According to an exemplary embodiment, reflective far field holograms according to the present invention are incorporated into stickers. When a sharp point-like light source is viewed after being reflected by the far field hologram, the desired light pattern will appear surrounding the light.

The present invention has been described in terms of preferred embodiments, however, it will be appreciated that various modifications and improvements may be made to the described embodiments without departing from the scope of the invention.

What is claimed is:

1. A viewing device for viewing by a user, the device comprising:

a support structure; and a far field transmission hologram supported by the support structure, the far field transmission hologram having a graphic image encoded therein;

wherein, when the support structure is disposed in a viewing position of the user, the graphic image is superimposed, with substantially no reversed diffracted copy of the graphic image, on a natural scene as viewed by the user through the hologram, and wherein the superimposed graphic image and the natural scene are viewable by the user in combination with substantial clarity.

2. The viewing device of claim 1, wherein the far field transmission hologram is a spatially varying diffraction efficiency far field hologram.

3. The viewing device of claim 2, wherein the far field transmission hologram is a fill factor modulated far field hologram.

4. The viewing device of claim 3, wherein the support structure is formed as a spectacle frame.

5. The viewing device of claim 3, wherein the support structure is formed as a hand-held viewer.

6. The viewing device of claim 3, wherein the support structure is formed as a bookmark.

7. The viewing device of claim 3, wherein the support structure is formed as an article of jewelry.

8. The viewing device of claim 2, wherein the far field transmission hologram has a high diffraction efficiency region with plural low diffraction efficiency regions distributed irregularly across the high diffraction efficiency region.

9. The viewing device of claim 8, wherein the percentage of area of the far field transmission hologram occupied by the plural low diffraction efficiency regions is selected so as to obtain a balance of un-diffracted light seen by the user and light diffracted into the graphic image.

10. The viewing device of claim 8, wherein the size of each of the plural low diffraction efficiency regions is selected to be sufficiently large so as to prevent any diffraction patterns caused by the low diffraction efficiency regions from distracting from the graphic image.

11. The viewing device of claim 8, wherein the size of each of the plural low diffraction efficiency regions is selected to be sufficiently small so as to prevent a need to maintain precise position with respect to an eye of the user in order to view the graphic image.

12. The viewing device of claim 1, wherein the far field transmission hologram is a computer-generated multilevel phase far field transmission hologram.

13. A viewing device for viewing by a user, the device comprising:

a spectacle frame having lens apertures; and a far field transmission hologram disposed in one or more of the lens apertures of the frame, the far field transmission hologram having a graphic image encoded therein;

wherein, when the spectacle frame is disposed in a viewing position of the user, the graphic image is superimposed, with substantially no reversed diffracted copy of the graphic image, on a natural scene as viewed by the user through the hologram, and wherein the superimposed graphic image and the natural scene are viewable by the user in combination with substantial clarity.

14. The viewing device of claim 13, wherein the far field transmission hologram is a fill factor modulated far field hologram.

15. The viewing device of claim 13, wherein the far field transmission hologram is a spatially varying diffraction efficiency far field hologram.

16. The viewing device of claim 13, wherein the far field transmission hologram includes an interferometrically recorded pattern of optical phase variation.

17. The viewing device of claim 13, wherein the far field transmission hologram is a computer-generated multilevel phase far field transmission hologram.

18. A filter for use with a camera having a light gathering path and an image sensor, the filter comprising:

a far field transmission hologram, the far field transmission hologram having a graphic image encoded therein and being adapted for mounting in the light gathering path;

wherein, when the far field transmission hologram is mounted in the light gathering path, the graphic image is superimposed, with substantially no reversed diffracted copy of the graphic image, on a natural scene as viewed by the image sensor through the hologram, and wherein the superimposed graphic image and the natural scene are viewable by the image sensor in combination with substantial clarity.

19. The filter of claim 18, wherein the far field transmission hologram is a fill factor modulated far field hologram.

20. The filter of claim 18, wherein the far field transmission hologram is a computer-generated multilevel phase far field transmission hologram.

21. The filter of claim 18, further comprising:

a filter frame, the far field transmission hologram being mounted in the frame.

*22. A viewing device for viewing by a user, the device comprising:*

*a support structure; and*

*a far field transmission hologram supported by the support structure, the far field transmission hologram having a graphic image encoded therein;*

*wherein, when the support structure is disposed in a viewing position of the user, the graphic image is superimposed on a natural scene as viewed by the user through the hologram,*

*wherein the superimposed graphic image and the natural scene are viewable by the user in combination with substantial clarity, and*

*wherein the far field transmission hologram is a spatially varying diffraction efficiency far field hologram.*

*23. The viewing device of claim 22, wherein the far field transmission hologram is a fill factor modulated far field hologram.*

*24. The viewing device of claim 23, wherein the support structure is formed as a spectacle frame.*

*25. The viewing device of claim 23, wherein the support structure is formed as a hand-held viewer.*

*26. The viewing device of claim 23, wherein the support structure is formed as a bookmark.*

*27. The viewing device of claim 23, wherein the support structure is formed as an article of jewelry.*

*28. The viewing device of claim 22, wherein the far field transmission hologram has a high diffraction efficiency region with plural low diffraction efficiency regions distributed irregularly across the high diffraction efficiency region.*

*29. The viewing device of claim 28, wherein the percentage of area of the far field transmission hologram occupied by the plural low diffraction efficiency regions is selected so as to obtain a balance of un-diffracted light seen by the user and light diffracted into the graphic image.*

*30. The viewing device of claim 28, wherein the size of each of the plural low diffraction efficiency regions is selected to be sufficiently large so as to prevent any diffraction patterns caused by the low diffraction efficiency regions from distracting from the graphic image.*

*31. The viewing device of claim 28, wherein the size of each of the plural low diffraction efficiency regions is selected to be sufficiently small so as to prevent a need to maintain precise position with respect to an eye of the user in order to view the graphic image.*

*32. A viewing device for viewing by a user, the device comprising:*

*a spectacle frame having lens apertures; and*

*a far field transmission hologram disposed in one or more of the lens apertures of the frame, the far field transmission hologram having a graphic image encoded therein;*

*wherein, when the spectacle frame is disposed in a viewing position of the user, the graphic image is superimposed on a natural scene as viewed by the user through the hologram,*

*wherein the superimposed graphic image and the natural scene are viewable by the user in combination with substantial clarity, and*

*wherein the far field transmission hologram is a fill factor modulated far field hologram.*

*33. A viewing device for viewing by a user, the device comprising:*

*a spectacle frame having lens apertures; and*

*a far field transmission hologram disposed in one or more of the lens apertures of the frame, the far field transmission hologram having a graphic image encoded therein;*

*wherein, when the spectacle frame is disposed in a viewing position of the user, the graphic image is superimposed on a natural scene as viewed by the user through the hologram,*

*wherein the superimposed graphic image and the natural scene are viewable by the user in combination with substantial clarity, and*

*wherein the far field transmission hologram is a spatially varying diffraction efficiency far field hologram.*

*34. A filter for use with a camera having a light gathering path and an image sensor, the filter comprising:*

*a far field transmission hologram, the far field transmission hologram having a graphic image encoded therein and being adapted for mounting in the light gathering path;*

*wherein, when the far field transmission hologram is mounted in the light gathering path, the graphic image is superimposed on a natural scene as viewed by the image sensor through the hologram,*

*wherein the superimposed graphic image and the natural scene are viewable by the image sensor in combination with substantial clarity, and*

*wherein the far field transmission hologram is a fill factor modulated far field transmission hologram.*

*35. The filter of claim 34, further comprising:*

*a filter frame, the far field transmission hologram being mounted in the frame.*

*36. A filter for use with a camera having a light gathering path and an image sensor, the filter comprising:*

*a far field transmission hologram, the far field transmission hologram having a graphic image encoded therein and being adapted for mounting in the light gathering path;*

*wherein, when the far field transmission hologram is mounted in the light gathering path, the graphic image is superimposed on a natural scene as viewed by the image sensor through the hologram,*

*wherein the superimposed graphic image and the natural scene are viewable by the image sensor in combination with substantial clarity, and*

*wherein the far field transmission hologram is a spatially varying diffraction efficiency hologram.*

*37. The filter of claim 36, further comprising:*

*a filter frame, the far field transmission hologram being mounted in the frame.*

*38. A viewing device for viewing by a user, the device comprising:*

*a support structure; and*

*a far field transmission hologram supported by the support structure, the far field transmission hologram having a graphic image encoded therein;*

*wherein, when the support structure is disposed in a viewing position of the user, the graphic image is superimposed on a natural scene as viewed by the user through the hologram,*

*wherein the superimposed graphic image and the natural scene are viewable by the user in combination with substantial clarity,*

*wherein the far field transmission hologram is a spatially varying diffraction efficiency far field hologram, and*

*wherein the far field transmission hologram has plural high diffraction efficiency regions and plural low diffraction efficiency regions distributed among the high diffraction efficiency regions.*

*39. A viewing device of claim 38, wherein at least a portion of the plural high diffraction efficiency regions are contiguous with one another.*

*40. A viewing device of claim 38, wherein at least a portion of the plural low diffraction efficiency regions are contiguous with one another.*

*41. A viewing device of claim 38, wherein the plural low diffraction efficiency regions are distributed irregularly among the high diffraction efficiency regions.*

* * * * *